United States Patent
Greene

(10) Patent No.: US 8,595,989 B1
(45) Date of Patent: Dec. 3, 2013

(54) SIDE WALL DECK FOR GRAIN BIN

(71) Applicant: Greene Welding and Hardware, Inc., East Lynn, IL (US)

(72) Inventor: Rex A. Greene, East Lynn, IL (US)

(73) Assignee: Greene Welding and Hardware, Inc., East Lynn, IL (US)

( * ) Notice: Subject to any disclaimer, the term of this patent is extended or adjusted under 35 U.S.C. 154(b) by 0 days.

(21) Appl. No.: 13/630,576

(22) Filed: Sep. 28, 2012

Related U.S. Application Data

(63) Continuation-in-part of application No. 13/606,296, filed on Sep. 7, 2012, now Pat. No. 8,434,273.

(51) Int. Cl.
*E04B 7/00* (2006.01)

(52) U.S. Cl.
USPC ................ 52/82; 52/182; 52/187; 52/192

(58) Field of Classification Search
USPC ............. 52/82, 182, 187, 192, 193, 194, 195, 52/196, 197, 223.3, 244, 245, 650.3, 52/745.01; 182/45, 82, 128
See application file for complete search history.

(56) References Cited

U.S. PATENT DOCUMENTS

| | | | | |
|---|---|---|---|---|
| 1,732,400 A * | 10/1929 | Eaton | | 52/192 |
| 1,977,391 A * | 10/1934 | Kramer | | 454/182 |
| 1,981,422 A * | 11/1934 | Kreutzer | | 454/174 |
| 2,623,643 A * | 12/1952 | Seamans | | 212/179 |
| 3,583,112 A * | 6/1971 | Kennedy | | 52/82 |
| 3,595,510 A * | 7/1971 | Hutchinson | | 248/175 |
| 4,057,295 A * | 11/1977 | Liet et al. | | 406/52 |
| 4,143,740 A | 3/1979 | Matthews | | |
| 4,355,700 A | 10/1982 | Matthews et al. | | |
| 4,419,851 A * | 12/1983 | Kruger | | 52/184 |
| 4,480,534 A * | 11/1984 | Sloan | | 454/182 |
| 4,527,366 A | 7/1985 | Greene et al. | | |
| 4,867,046 A * | 9/1989 | Yoder | | 454/174 |
| 5,020,246 A * | 6/1991 | Rust et al. | | 34/236 |
| 5,586,678 A * | 12/1996 | Rosch et al. | | 220/263 |
| 5,638,917 A * | 6/1997 | Vennen | | 182/150 |
| 5,829,549 A * | 11/1998 | Flynn | | 182/82 |
| 6,698,143 B2 * | 3/2004 | Jensen et al. | | 52/82 |
| 6,886,662 B2 * | 5/2005 | Riley | | 182/82 |
| 7,487,619 B2 * | 2/2009 | Glenn | | 52/194 |
| 8,220,207 B2 * | 7/2012 | Shan et al. | | 52/82 |
| 2003/0217520 A1 * | 11/2003 | Jensen et al. | | 52/82 |
| 2006/0213722 A1 * | 9/2006 | Cunningham | | 182/82 |
| 2008/0155909 A1 * | 7/2008 | Grossman et al. | | 52/192 |
| 2010/0139185 A1 * | 6/2010 | Neighbors | | 52/194 |
| 2010/0307072 A1 * | 12/2010 | Shan et al. | | 52/82 |
| 2012/0214400 A1 * | 8/2012 | Hanig et al. | | 454/365 |

\* cited by examiner

*Primary Examiner* — James Buckle, Jr.
(74) *Attorney, Agent, or Firm* — Cook Alex Ltd.

(57) ABSTRACT

A grain bin and deck assembly includes a generally cylindrical grain bin having an inclined roof and a substantially vertical cylindrical side wall the top of which is located adjacent to the bottom of the inclined roof, and a deck encircles at least a portion of the cylindrical side wall beneath the bottom of the inclined roof and the deck is positioned to permit access to vents on the roof. The deck is mounted to and supported on the exterior of the side wall and its side wall stiffeners which stiffeners are spaced from each other and extend substantially vertically over at least a portion of the height of the cylindrical side wall and adjacent the top of the cylindrical side wall. The deck is fastened to the stiffeners of the side wall by a support assembly which includes mounting plates having a width that extends across the width of the stiffeners, and the mounting plates have plural rows of holes which are arranged to overlie stiffeners of differing widths.

20 Claims, 3 Drawing Sheets

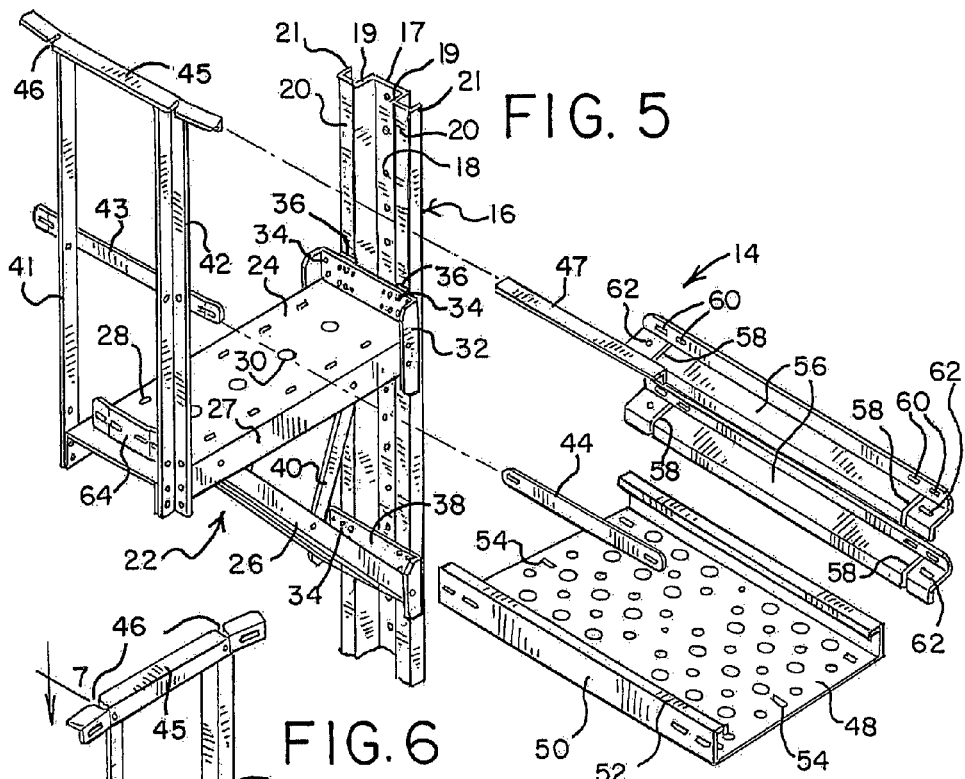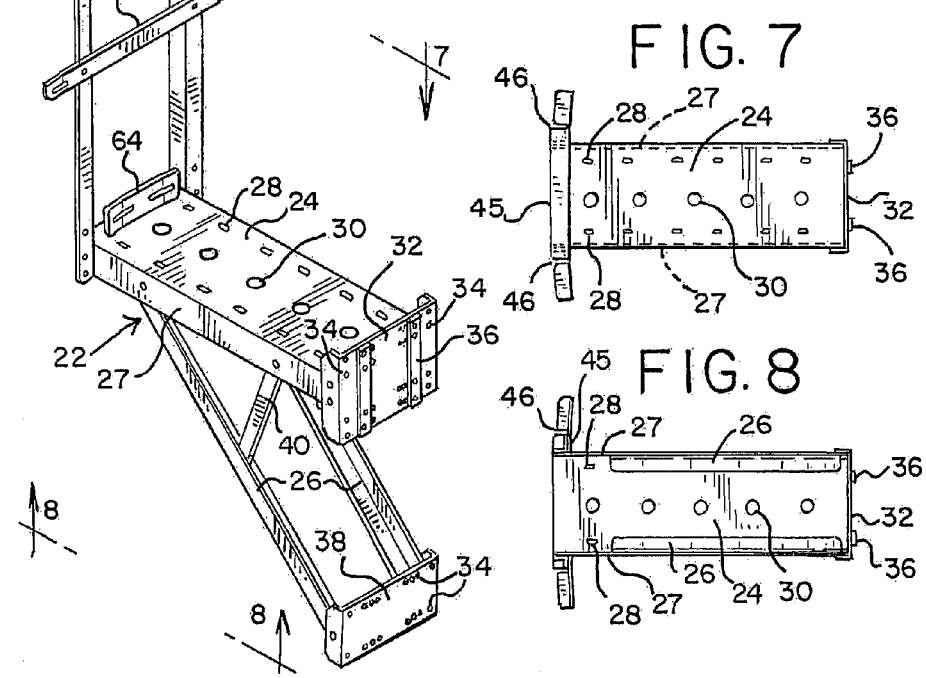

SIDE WALL DECK FOR GRAIN BIN

BACKGROUND AND SUMMARY OF THE INVENTION

The present invention relates to a deck for the side wall of a cylindrical storage structure.

Cylindrical storage structures having inclined roofs, such as grain bins for the storage of grain, are typically filled by conveying the grain to the peak of the roof through an access which may be opened to admit the grain and closed to protect the grain from weather once the grain is in the grain bin. To ensure proper ventilation of the grain bin, several power exhaust fans are typically located on the inclined roof toward its top, and the fans are spaced from each other around the curvature of the roof. Once the grain has been admitted to the grain bin, the only reasonable access to these power exhaust fans to service them is from the roof of the grain bin. In order to facilitate the servicing of these power exhaust fans, decks have been mounted on the roof of the grain bin in proximity to the exhaust fans to permit access to the fans from the roof by service personnel. Once such roof deck construction is disclosed in my copending U.S. patent application Ser. No. 13/606,296, filed Sep. 7, 2012, the disclosure of which is incorporated herein in its entirety by reference.

Such grain bins also have screened vents spaced around the lower end of the inclined roof through which air is drawn into the top of the grain bin by the power exhaust fans. The air which enters through the vents is circulated above the grain and exhausted by the power exhaust fans. The vents are also used to release air when aeration fans at the floor of the bin are operated under the grain to push air upward from the bottom of the bin for maintaining grain condition. These vents may be numerous and on larger diameter grain bins may be upward to seventy in number.

It is periodically desired to fumigate the grain in the bin with certain gases which are introduced at the bottom of the grain bin to kill pests and neutralize certain undesirable contaminants which may be on the grain, such as molds or the like. During such fumigation, the vents are covered with a covering such as a plastic sheet or bag to block air from entering the grain bin through the vents. Also when the aeration fans force air upward from the floor of the bin, debris can catch on the vent screens, or weather conditions can cause icing on the screens. When either of these conditions occur, the vents cannot release the necessary air volume and the positive pressure from the aeration fans can cause roof damage. Covering and uncovering of the vents for the fumigation procedure and maintenance and cleaning of the vent screens has typically been accomplished in the past by service personnel who are positioned at and moved sequentially one by one between each of the vents by a cherry picker.

In the present invention, a deck has been developed which extends around and encircles the cylindrical side wall of the grain bin beneath the bottom of its inclined roof adjacent to the top of the side wall and to the vents to permit service personnel to access the vents from the exterior of the grain bin to cover and uncover the grain bin vents and to clean, inspect and maintain the vents without the need for a cherry picker.

In one principal aspect of the present invention, a grain bin and deck assembly comprises a generally cylindrical grain bin having an inclined roof and a substantially vertical cylindrical side wall the top of which is located adjacent the bottom of the inclined roof, and a deck encircles at least a portion of the cylindrical side wall beneath the bottom of the inclined roof.

In another principal aspect of the present invention, the deck is adjacent the top of the side wall.

In still another principal aspect of the present invention, the deck is mounted to and supported on the cylindrical side wall.

In still another principal aspect of the present invention, the deck substantially entirely encircles the cylindrical side wall.

In still another principal aspect of the present invention, the side wall includes stiffeners on its exterior which are spaced from each other and which extend substantially vertically over at least a portion of the height of the cylindrical side wall and adjacent the top of the cylindrical side wall, and the deck is mounted to the stiffeners.

In still another principal aspect of the present invention, the inclined roof includes vents adjacent the bottom of the inclined roof, and the deck is positioned on cylindrical side wall so as to permit access to the vents.

In still another principal aspect of the present invention, a deck for mounting to the side wall of a cylindrical storage container comprises a support assembly comprising a horizontal cross support, and an angular brace extending at an angle to the horizontal cross support. The angular brace has one of its ends fastened at one end of the horizontal cross support. At least one hand rail post is mounted to the one end of the horizontal cross support and a hand rail is mounted to the hand rail post above the horizontal cross support. At least one mounting plate is mounted at the other end of the horizontal cross support or the angular brace, and the mounting plate has a width that extends across the width of a vertical stiffener on the side wall of the cylindrical storage container to permit the mounting plate to be fastened to one stiffener to mount the deck to the side wall, and a deck plate extends horizontally from and is mounted on the horizontal cross support.

In still another principal aspect of the present invention, the deck includes two mounting plates one of which is mounted to the other end of the horizontal cross support and the other of which is mounted to the other end of the angular brace, and each of the mounting plates extends across the width of one vertical stiffener on the side wall of the cylindrical storage container to mount the mounting plates to the stiffener.

In still another principal aspect of the present invention, the mounting plates have plural pairs of rows of holes in which the plural pairs of rows of holes are arranged to overlie stiffeners of differing widths.

In still another principal aspect of the present invention, a strengthening backer is positioned on at least one of the mounting plates between the mounting plate and the stiffener, and the strengthening backer has holes which align with holes in the mounting plate.

In still another principal aspect of the present invention, the deck plate is trapezoidal in shape to permit the deck to curve around the side wall of the cylindrical storage container.

In still another principal aspect of the present invention, the deck includes a tie bar extending between the horizontal cross support and the angular brace.

In still another principal aspect of the present invention, the deck includes at least one kick rail positioned above the deck plate and attached at each end to adjacent stiffeners.

In still another principal aspect of the present invention, the cylindrical storage container is a grain bin.

These and other objects, features and advantages of the present invention will become readily understood upon a consideration of the following detailed description.

BRIEF DESCRIPTION OF THE DRAWINGS

In the course of this description, the drawings will frequently be referred to in which:

FIG. 5 is an exploded view of a single unit of the side wall deck showing its individual components;

FIG. 6 is a perspective view of the assembled support and hand rail assembly of the side wall deck;

FIG. 7 is a top plan view of the support assembly of the side wall deck as viewed substantially along line 7-7 of FIG. 6; and FIG. 8 is a bottom plan view of the support assembly of the side wall deck as viewed substantially along line 8-8 of FIG. 6.

DESCRIPTION OF THE PREFERRED EMBODIMENT

Figure 1:
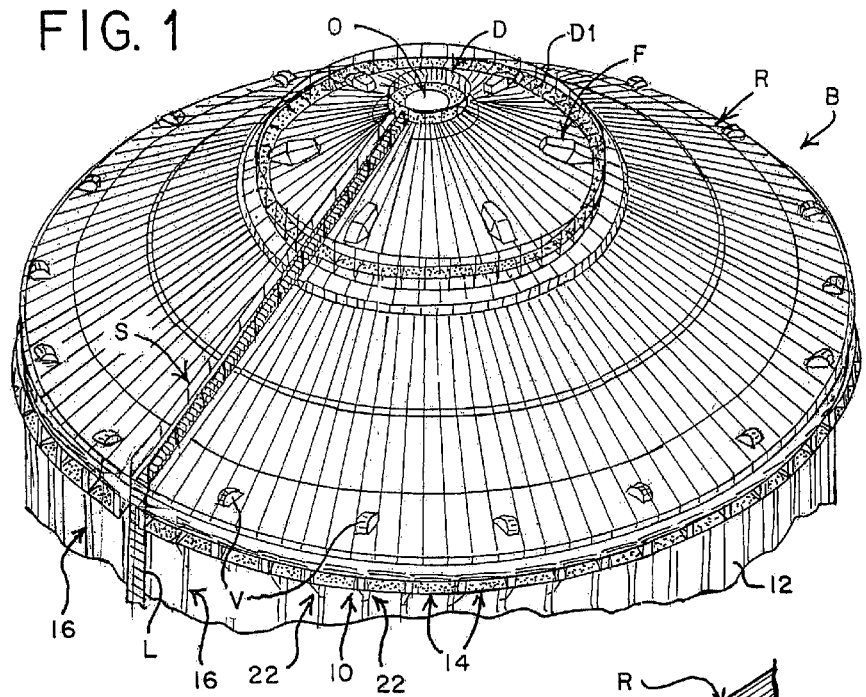
FIG. 1 is a perspective, broken view of the top of a grain bin including a deck adjacent the top of its cylindrical side wall in accordance with the principles of the present invention.
Figure 2:
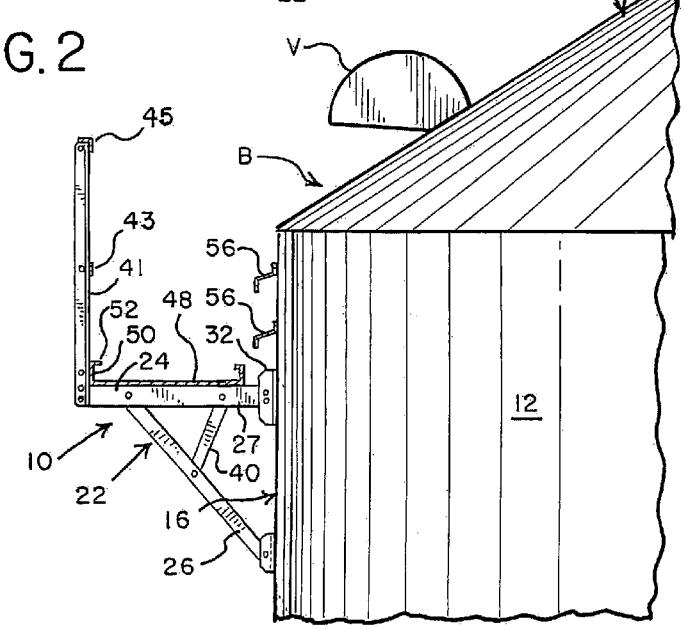
FIG. 2 is a broken, cross sectioned end elevation view of the side wall deck as mounted to the grain bin.

As shown in FIG. 1, a generally cylindrical storage structure, such as a grain bin B for the storage of grain, is shown having an inclined roof R. In such grain bins the grain is loaded by a conveyor (not shown) into the bin through an access opening O at the top apex of the roof R. Once the grain has been loaded into the bin, the opening O is closed by a closure (not shown) to prevent the entry of rain and other foreign materials into the bin.

In order to facilitate the loading of the grain bin B, a small deck D is typically located adjacent to the opening O.

Power exhaust fans F are also typically mounted to the roof R near the top of the roof but somewhat down the incline from the deck D and access opening O, and vents V are spaced from each other around the bottom of the roof as seen in FIG. 1. The power exhaust fans F are spaced from each other around the curvature of the roof R as seen in FIG. 1 and by drawing in air through the vents V, the interior of the grain bin is ventilated to remove undesirable moisture and possibly hazardous dust from the grain bin B. It is important that the power exhaust fans are operative to perform their function so it is desirable to be able to service these fans on an ongoing basis to ensure their continuing operation. However, access to these fans for that purpose from the interior of the filled grain bin is limited. Accordingly, in the past a deck D1 has been constructed on the inclined roof adjacent the power exhaust fans F and on the exterior of the roof R. As previously mentioned, an example of such roof deck construction is shown in my copending U.S. patent application Ser. No. 13/606,296, filed Sep. 7, 2012 to permit access for the servicing of the power exhaust fans. Both the exhaust fan deck D1 and the deck D at the top of the grain bin have also been accessed by steps S as shown in FIG. 1.

As previously discussed, the vents V also need to be accessed when preparing to fumigate the ingredients in the grain bin to cover the vents to prevent air flow through them into the bin during the fumigation process, and to uncover the vents after fumigation is completed to permit the power exhaust fans F to resume drawing air through the vents V to remove undesirable moisture and possibly hazardous dust from the grain bin B. The vents also need to be accessed to prevent excess positive air pressure caused by the vent screen becoming clogged with debris from the grain or icing which can be hazardous. The present invention is directed to a side wall deck 10 which is mounted to the side wall 12 of the grain bin B to facilitate access to these vents V for those purposes.

Figure 3:
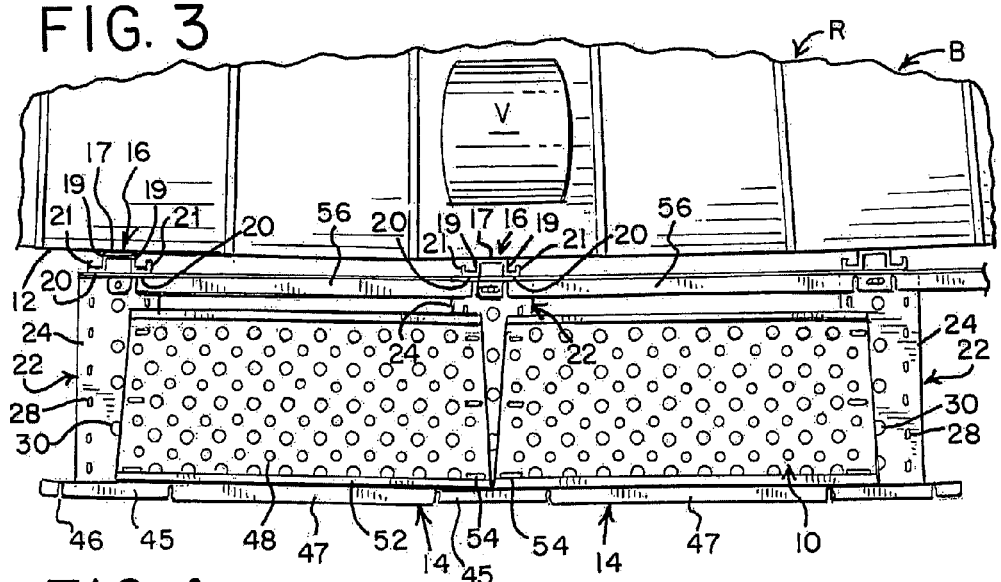
FIG. 3 is a broken, partial plan view of two units of the side wall deck as mounted to the grain bin.
Figure 4:
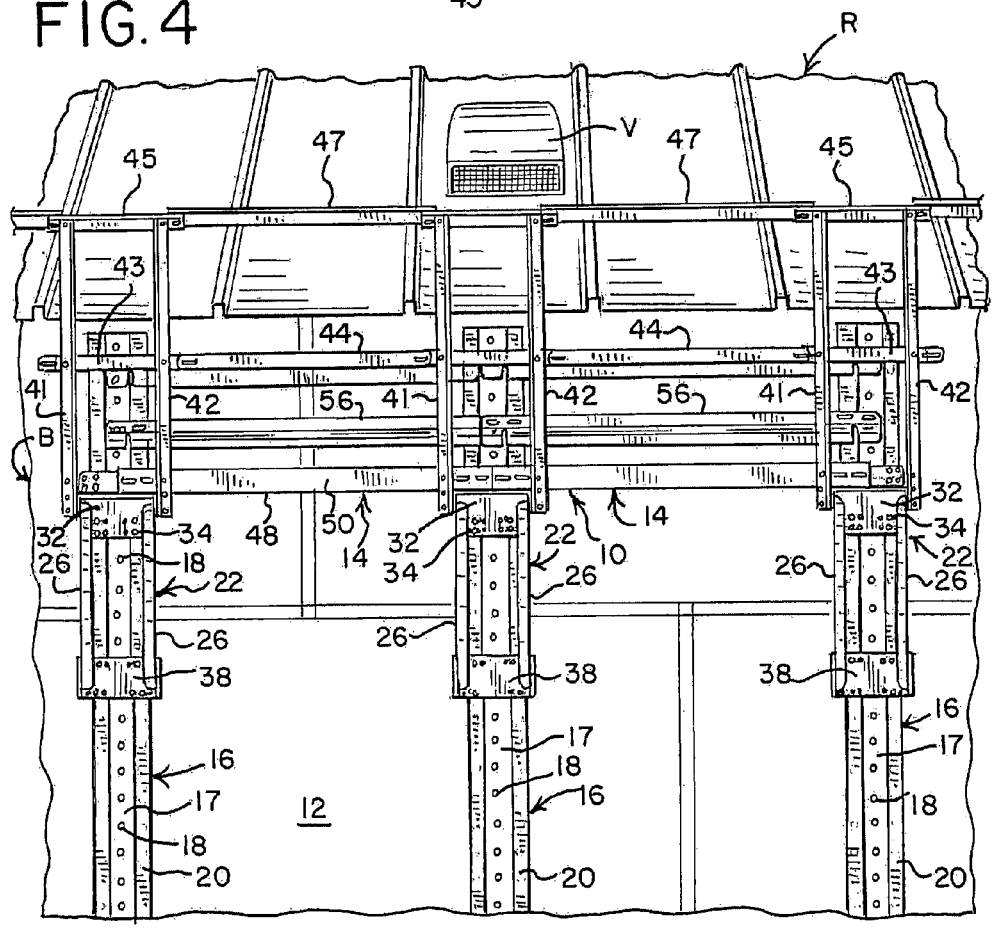
FIG. 4 is a broken, partial side elevation view of two units of the side wall deck as mounted to the grain bin.

The deck 10 of the present invention comprises a plurality of side by side deck units or sections 14 as are shown in FIGS. 1, 3 and 4. The deck units 14 comprise a plurality of components which are constructed and designed to be assembled together to form each deck unit. Each deck unit is mounted to one of the vertical stiffeners 16 which are part of the normal construction of most if not all of the various manufacturer's of grain bins.

The stiffeners 16 are typically generally "W" shaped in cross section as best seen in FIGS. 3 and 5 having a central web 17 with a series of holes 18 to permit the stiffeners to be fastened vertically to the side wall 12 of the grain bin. Flanges 19 extend generally perpendicularly from the web 17 and flanges 20 extend generally perpendicularly to the flanges 19. Many of the different manufacturer's stiffeners 16 may also include a further flange 21 which extends back in the direction of the web 17 for further stiffening the stiffeners.

The stiffeners 16 are fastened vertically to the side wall 12 of the grain bin as best seen in FIG. 4 and extend from adjacent the bottom of the roof R of the grain bin over substantially the entire height of the side wall 12 of the grain bin, and they are attached to the grain bin side wall 12 by suitable fastening means such as bolts or rivets through the holes 18 in the web 17 of the stiffeners.

Each deck section or unit 14 includes a support assembly 22 which comprises a horizontal cross support plate 24 and a pair of spaced angular braces 26 which are attached at their upper ends to downwardly extending flanges 27 on the cross support plate 24 of the support assembly 22 toward the cross support plate's outer end.

The cross support plate 24 has a plurality of slotted openings 28 along each side edge to permit fastening of deck plates between adjacent support assemblies 22 as will be later described. The cross support plates 24 may optionally also include openings 30 down their centers which facilitate drainage of water from the upwardly facing cross support plates 24.

A "U" shaped upper mounting plate 32 is mounted to the inner ends of the cross support plates 24. The upper mounting plate 32 includes a plurality of holes 34 arranged in vertical rows across the cross support plate 24 as best seen in FIG. 6. These rows of holes 34 are arranged so that at least a pair of rows of holes will overlie the two horizontal flanges 20 of the particular stiffeners 16 used by any given grain bin manufacturer so that the need for custom upper mounting plates is avoided because there will always be a pair of rows of holes to accommodate the stiffener width of any given manufacturer. A narrower strengthening backer 36 may also be positioned between the upper mounting plate 32 and the stiffener 16 as best seen in FIGS. 6-8 to further strengthen the mounting plate 32.

A "U" shaped lower mounting plate 38 is also preferably mounted to the lower inner ends of the angular braces 26. The lower mounting plate 38 also includes vertical rows of holes 40 for attachment to the horizontal flanges 20 of the stiffeners 16 in a manner similar to the attachment of the upper mounting plate 32 to those flanges.

To fasten the upper and lower mounting plates 32 and 38 to the flanges 20 on the stiffeners 16, the mounting plates are placed in their desired position at rest on the flanges 20 and so that a pair of rows of overlying holes in the mounting plates overlie the stiffener flanges 20, holes corresponding to the overlying holes in the mounting plates are drilled through the stiffener flanges 20, and suitable fasteners, such as bolts or rivets, are extended through the holes in the mounting plates and the stiffener flanges 20 to fasten them together.

The support assembly 22 also preferably includes a pair of tie bars 40 extending between the downwardly extending flanges 27 of the cross support plate 24 and the angular braces 26 to further strengthen the support assembly 22.

A pair of hand rail posts 41 and 42 are also fastened at their bottoms to the outer ends of the flanges 27 of the cross support plate 24. An interrail 43 is attached to the posts 41 and 42 intermediate the height of the posts and a hand rail 45 is fastened to the tops of the posts 41 and 42. Because the hand rail 45 as shown is an angle member, it is notched at 46 to permit its ends to flex relative to the major portion of the hand rail 45 to accommodate the curvature of the grain bin side wall. The ends of the hand rail 45 are also slotted to permit fastening to the ends longer adjacent hand rails 47. The ends of the interrail 43 are also slotted to permit fastening to the ends of the longer adjacent interrails 44.

A deck plate 48 preferably includes an upwardly extending elongate flange 50 along its side edges and an inwardly and downwardly extending angled flange 52 along the edge of flange 50 as best seen in FIG. 5. Flanges 50 and 52 strengthen the deck plate against flexing and prevent loose articles from falling off the deck. The deck plate 48 also includes slots 54 at each of its ends which align with slots 28 on the cross support plate 24 to permit the deck plate 48 to be adjustably fastened to the cross support plate 24 in the final installation. Because of the slotted nature of the slots 28 and 54, the deck plates may be readily adjusted to compensate for the curvature of the grain bin side wall 12. As best seen in FIG. 3, the deck plates 48 are also somewhat trapezoidal in shape to compensate for the same such side wall curvature.

Finally, one or more kick rails 56 are preferably provided to prevent loose materials from falling in any space that may exist between the inner side of the deck plates 48 and the side wall 12 of the bin. The kick rails 56 are also preferably slotted at 58 across their width at their ends to permit them to also flex to accommodate the curvature of the side wall 12 of the bin. The kick rails 56 are also slotted at 60 to permit fastening to the flanges 20 of the stiffeners 16 and openings 62 to ends of the kick rails to be spliced together by a splice plate 64.

The side wall deck 10 of the present invention may be accessed either from the top of the grain bin via the inclined steps S or by way of a vertical ladder L extending down the side wall 12 of the grain bin as seen in FIG. 1.

It will be appreciated from the foregoing description of the invention that the side wall deck of the present invention readily facilitates access to the vents V on the grain bin to block or unblock them as desired for example when it is desired to fumigate the grain bin contents. It will also be appreciated that the side wall deck of the present invention is simple and sturdy in construction and assembly and includes components which need not be customized to accommodate the variations in grain bin construction and dimensioning of several different manufacturers.

It will also be appreciated that the preferred embodiment of the present invention which has been described is merely illustrative of only a few of the principles of the present invention. Numerous modifications may be made by those skilled in the art without departing from the true spirit and scope of the present invention.

The invention claimed is:

1. A deck for mounting to the side wall of a cylindrical storage container; said deck comprising:
   a support assembly comprising a horizontal cross support and an angular brace extending at an angle to said horizontal cross support; said angular brace having one of its ends fastened at one end of said horizontal cross support;
   at least one hand rail post mounted to said one end of said horizontal cross support;
   a hand rail mounted to said hand rail post above said horizontal cross support;
   at least one mounting plate mounted at the other end of said horizontal cross support or said angular brace, and between said ends and a vertical side wall stiffener on the exterior side wall of the cylindrical storage container, said mounting plate having a width that extends across the width of the vertical stiffener side wall stiffener on the exterior side wall of the cylindrical storage container to permit said mounting plate to be fastened to one said stiffener to mount the deck to the side wall; and
   a deck plate extending horizontally from and mounted on said horizontal cross support.

2. The deck of claim 1, including two mounting plates one of which is mounted to said other end of said horizontal cross support and the other of which is mounted to said other end of said angular brace, and each of said mounting plates extending across the width of one vertical stiffener on the side wall of the cylindrical storage container to mount the mounting plates to the stiffener.

3. The deck of claim 2, wherein said mounting plates have plural pairs of rows of holes in which said plural pairs of rows of holes are arranged to overlie stiffeners of differing widths.

4. The deck of claim 1, wherein said mounting plate has plural pairs of rows of holes in which said plural pairs of rows of holes are arranged to overlie stiffeners of differing widths.

5. The deck of claim 3 including a strengthening backer on at least one of said mounting plates between said mounting plate and the stiffener, said strengthening backer having holes which align with holes in said mounting plate.

6. The deck of claim 1, wherein said deck plate is trapezoidal in shape to permit the deck to curve around the side wall of the cylindrical storage container.

7. The deck of claim 1, including a tie bar extending between said horizontal cross support and said angular brace.

8. The deck of claim 1, including at least one kick rail positioned above said deck plate and said kick rail is attached at each end to adjacent stiffeners.

9. The deck of claim 1, wherein said cylindrical storage container is a grain bin.

10. The deck of claim 2, wherein said mounting plates have plural pairs of rows of holes in which said plural pairs of rows of holes are arranged to overlie stiffeners of differing widths;
    a strengthening backer on at least one of said mounting plates between said mounting plate and the stiffener, said strengthening backer having holes which align with holes in said mounting plate;
    said deck plate is trapezoidal in shape to permit the deck to curve around the side wall of the cylindrical storage container;
    a tie bar extending between said horizontal cross support and said angular brace;
    at least one kick rail positioned above said deck plate and said kick rail is attached at each end to adjacent stiffeners; and
    wherein said cylindrical storage container is a grain bin.

11. The deck of claim 10, wherein said kick rail extends substantially horizontally between said adjacent stiffeners.

12. The deck of claim 8, wherein said kick rail extends substantially horizontally between said adjacent stiffeners.

13. The deck of claim 1, wherein said deck substantially entirely encircles said cylindrical side wall.

14. A grain bin and deck assembly,
    said grain bin comprising a generally cylindrical grain bin having an inclined roof;

a substantially vertical cylindrical side wall the top of which is located adjacent the bottom of said inclined roof;

a stiffener on the exterior of said side wall which extends over the height of said side wall to support said side wall over its height, said stiffener having a web attached to said side wall and a flange spaced from and attached to said web and spaced from said side wall; and wherein said deck assembly comprises a deck encircling at least a portion of said cylindrical side wall adjacent the top of said side wall but beneath the bottom of said inclined roof, said deck being mounted to said flange of said stiffener.

15. The assembly of claim 14, wherein said stiffener includes a second flange extending between said first mentioned flange and said web, said second flange attaching said first mentioned flange to said web and spacing said first mentioned flange from said web and said side wall.

16. The assembly of claim 14, wherein said stiffener includes a pair of said flanges spaced from each other, and said deck is mounted to said pair of flanges.

17. The assembly of claim 16, wherein said grain bin includes a plurality of said stiffeners on the exterior of said side wall and which stiffeners are spaced from each other.

18. The assembly of claim 14, wherein said grain bin includes a plurality of said stiffeners on the exterior of said side wall and which stiffeners are spaced from each other.

19. The assembly of claim 14, wherein said grain bin includes at least one vent adjacent the bottom of said inclined roof, and said deck is adjacent said vent to permit access to said vent from said deck.

20. The assembly of claim 14, wherein said deck substantially entirely encircles said cylindrical side wall.

* * * * *